W. R. PEET
DITCHER.

No. 189,647.                               Patented April 17, 1877.

WITNESSES:
Gustave Dieterich
J. H. Scarborough

INVENTOR:
W. R. Peet
BY
[signature]
ATTORNEYS

UNITED STATES PATENT OFFICE.

WILBUR R. PEET, OF VIOLA, IOWA.

IMPROVEMENT IN DITCHERS.

Specification forming part of Letters Patent No. 189,647, dated April 17, 1877; application filed January 29, 1877.

*To all whom it may concern:*

Figure 1:
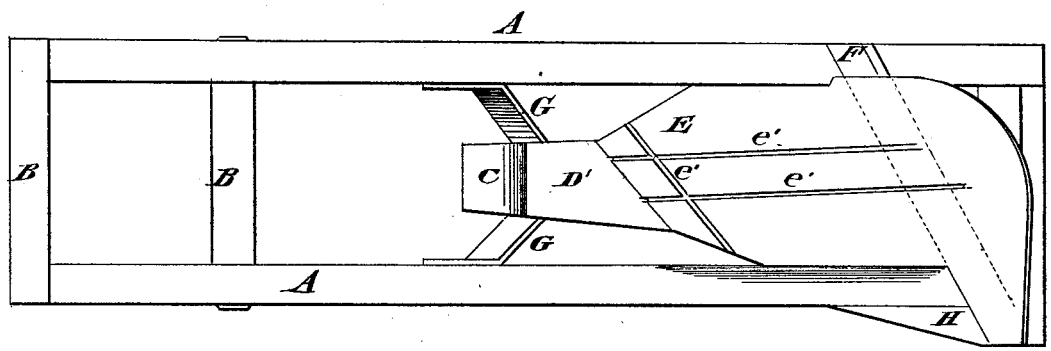
Figure 2:
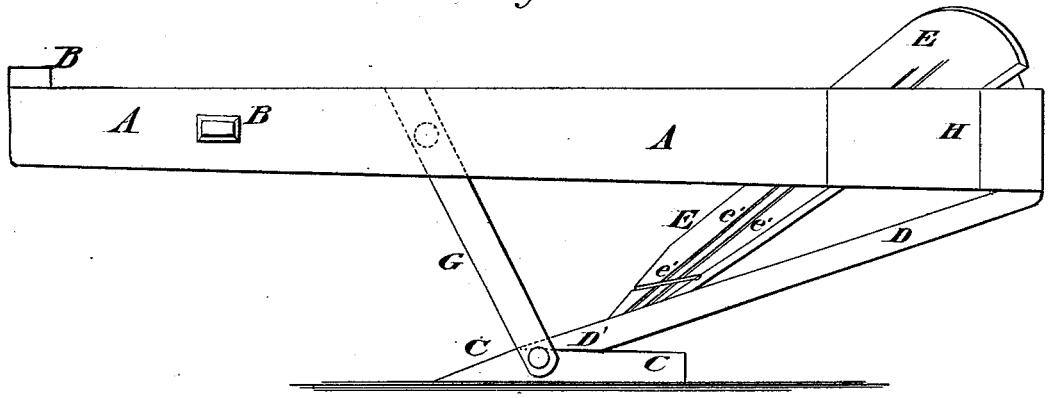

Be it known that I, WILBUR R. PEET, of Viola, Linn county, Iowa, have invented an Improvement in Ditchers, of which the following is a specification:

Figure 1 of the drawing is a top view, and Fig. 2 a side view.

The invention will first be described in connection with the drawing, and then pointed out in the claim.

A represents two parallel bars, connected by the cross-bars B. G G are the side, and C the bottom, cutters, connected and arranged in the usual manner. With the bottom cutter C I conjoin a rest or extension, D', supported on any suitable bar, D, so as to allow the furrow-slice to begin to turn only at some distance from the knives, and thus prevent any strain that might arise from tearing the slice. I then arrange a turning-board, E, cut and fitting diagonally across the face of the rest D', and rising on a gradual lateral slant to and above the bars A, so that when the furrow-slice rises above the bars it will be thrown over and reversed from its natural position, and not merely turned on end. The turning-board E is provided with water-channels $e'$, to allow the moisture to drip back into the furrow.

I thus form a very simple and cheap ditcher, which is relieved of all the parts that usually cause the implement to twist, swerve, or deviate from a straight line.

What I claim as new is—

In a ditcher, the combination, with frame A B, share C, side cutters G G, and rest D', having extension D, of the turning-board E, inclined laterally as well as longitudinally, extending above the frame A B, and provided with channels $e'$, as and for the purpose specified.

WILBUR RILEY PEET.

Witnesses:
I. W. HODGIN,
J. L. INGRAM.